United States Patent Office

3,423,307
Patented Jan. 21, 1969

3,423,307
START-UP OF A HYDRODESULFURIZATION REACTION
Joel D. McKinney, Indiana Township, Allegheny County, and William C. Offutt, Pittsburgh, Pa., assignors to Gulf Research & Development Company, Pittsburgh, Pa., a corporation of Delaware
No Drawing. Filed Nov. 12, 1965, Ser. No. 507,571
U.S. Cl. 208—213
Int. Cl. C10g 23/00
9 Claims

ABSTRACT OF THE DISCLOSURE

This invention relates to a start-up procedure for use in a high severity hydrodesulfurization process for the desulfurization of residual stocks containing both sulfur and asphaltic materials employing a catalyst comprising metalliferous hydrogenating components composited with a support. The hydrodesulfurization process is conducted to remove at least 70 per cent of the sulfur with a hydrogen consumption from about 1 to 5 molecular weights of hydrogen per atomic weight of sulfur removed. The start-up procedure comprises initially contacting an asphaltic-free hydrocarbon with hydrogen and the catalyst at a temperature from 250° to 500° F. and then gradually increasing the temperature until a temperature within the range of 600° and 700° F. is attained. Contacting of the asphaltic-free hydrocarbon and the catalyst is then discontinued and contacting of the asphaltic-containing residual hydrocarbon and pretreated catalyst is then commenced.

---

Our invention relates to a start-up procedure to be employed with a process for the hydrodesulfurization of residual stocks.

Generally, the residual portion or fraction of crude oil contains large quantities of sulfur. Although the actual sulfur content of different residual fractions may vary to some extent due to their source, even the comparatively low sulfur content residuals contain a quantity of sulfur sufficient that any of the products obtained from such residual fraction are contaminated with sulfur to the extent that they are commercially undesirable. While it is known that a certain quantity of sulfur can be removed from hydrocarbon fractions by processes specifically directed to sulfur removal such as hydrodesulfurization and that certain quantities of sulfur are also removed from hydrocarbon fractions in other hydrotreating processes such as hydrocracking, the art is confronted with peculiar problems when attempting to apply such known processes to the treatment of residual fractions. Thus, when a residual fraction is hydrocracked, as with other fractions that are hydrocracked, the main effect of the process is the severing of carbon to carbon bonds. The over-all result, therefore, is a substantial reduction in boiling range of the treated material producing large quantities of what in many instances are undesired lower boiling materials. Furthermore, the large quantity of asphaltics in a residue causes a rapid coking and deactivation of the catalyst. When attempting to employ a hydrodesulfurization process charging a high sulfur content residual fraction it is usually necessary to operate at conditions which are effective to remove only about half of the sulfur present in the charge in order to provide a commercially feasible catalyst life. The reason for this is that if anything but the mildest hydrodesulfurization conditions are employed, the great quantity of asphaltic components present in a residual stock cause extremely rapid formation of coke on the catalyst, thereby deactivating the catalyst in a short period of time. Thus, the employment of high severity conditions in the hydrodesulfurization of a residual stock have previously been considered unfeasible due to the extremely short catalyst life resulting and the employment of comparatively mild conditions in the hydrodesulfurization of a residual stock does not effect removal of a sufficient quantity of sulfur to provide the desired low sulfur content products.

Our invention comprises a start-up procedure to be employed with a high severity process for the hydrodesulfurization of a residual stock which provides improved catalyst life. The high severity hydrodesulfurization process with which our start-up procedure is to be employed is one wherein the charge stock is composed substantially of residual hydrocarbon materials boiling above about 900° F. and contains a substantial quantity of asphaltic materials. Thus, the charge stock could be one having an initial or 5% boilng point somewhat below 900° F., such as, for example, about 600° or 650° F., provided a substantial proportion, for example, about 40 or 50% by volume, of its hydrocarbon components boil above about 900° F. A hydrocarbon stock having a 50% boiling point of about 900° F. and which contains asphaltic materials is illustrative of such charge stock. The catalyst employed in the hydrodesulfurization process comprises a metalliferous hydrogenating component composited with a suitable carrier wherein the metalliferous hydrogenating component is in a substantially sulfided form during the major portion of the hydrodesulfurization process. The hydrodesulfurization process is conducted under conditions of high severity so that at least about 70%, and preferably about 75 or 80%, of the sulfur contained in the residual hydrocarbon feed stock is removed and that there is a hydrogen consumption from about 1 to about 5 molecular weights of hydrogen per atomic weight of sulfur removed. The temperature employed in the hydrodesulfurization process can be in the range up to about 850° F., preferably, however, the temperature employed does not exceed about 800° F.

The start-up procedure of our invention comprises initially contacting a hydrocarbon which is substantially free of asphaltic materials with hydrogen in the presence of the catalyst (a metalliferous hydrogenating component supported on an alumina carrier) at a temperature from about 250° to about 500° F., preferably 300° to about 400° F., a hydrogen partial pressure from about 750 to about 5000 p.s.i. and at a space velocity from about 0.1 to about 10.0 volumes of the asphaltic-free hydrocarbon per hour per volume of catalyst and thereafter gradually increasing the temperature to the range from about 600° to about 700° F. This contacting of the asphaltic-free hydrocarbon is continued for a period of at least about 8 hours after which the contacting of the asphaltic-free hydrocarbon is discontinued and the contacting of the asphaltic containing residual hydrocarbon is commenced. The contacting of the asphaltic containing residual hydrocarbon during the hydrodesulfurization process is conducted at substantially the same pressure and space velocity employed during the contacting of the asphaltic-free hydrocarbon in the start-up procedure.

The asphaltic-free hydrocarbon employed in the start-up procedure of our invention can be any hydrocarbon stock or fraction which is substantially free of asphaltic materials. Such stocks include, for example, propane deasphalted residuums, vacuum distillates boiling up to about 1100° F. and generally hydrocarbon fractions boiling in the gas oil range or below, i.e. boiling below about 850° F. Asphaltic-free stocks of this latter type can be, for example, a gasoline, naphtha, furnace oil or gas oil fraction or a blend of these fractions. We prefer, however, to employ a gas oil fraction boiling from about 600° to about 850° F. The asphaltic-free hydrocarbon can also contain a substantial quantity of sulfur, for example, as much as about 3 or 4% by weight. We have found that it is generally advantageous to effect initial contacting between the asphaltic-free stock and the catalyst wherein the metalliferous hydrogenating component of the catalyst is in a substantially unsulfided state, such as, for example, in a partially sulfided state or in the oxide state, and wherein the asphaltic-free stock contains sulfur, thereby effecting in situ sulfiding of the catalyst. The sulfur in this stock can be in the form of sulfur compounds naturally occurring in the crude oil from which the fraction was obtained or the sulfur can be in the form of extraneous sulfur which has been added to the asphaltic-free hydrocarbon such as, for example, in the form of organic sulfides or mercaptans.

Within the broad operable ranges of operating conditions set forth above we have found that it is advantageous to operate the start-up procedure of our invention employing a hydrogen parial pressure from about 1500 to about 3000 p.s.i. and a space velocity from about 0.5 to about 5.0. We have also found that it is advantageous to increase the temperature in our start-up procedure at a rate less than about 100° F. per hour. Preferably, we employ a rate of temperature increase less than about 50° F. per hour but more than about 10° F. per hour. Although, as mentioned above, the temperature can be increased during the start-up procedure up to about 700° F., we prefer to obtain a maximum temperature in the start-up procedure in the range from about 600° to about 650° F.

In accordance with a preferred method of operating our start-up procedure we have found that additional advantages can be obtained in the conduct of the subsequent high severity hydrodesulfurization process if the temperature of the catalyst after having been contacted with the asphaltic-free stock and raised to a temperature of about 600° to 700° F. is then reduced to the range from about 400° to about 450° F. after discontinuing contact of the asphaltic-free hydrocarbon and before commencing contact of the asphaltic containing residual hydrocarbon charged in the hydrodesulfurization process.

The sulfur and residual containing hydrocarbon that is to be subjected to the hydrodesulfurization process can contain from about 2 to about 5 or 6% by weight sulfur and will usually contain at least about 50% by volume of the more difficultly vaporizable residual components boiling above about 900° F. Hydrocarbon stocks of this nature generally have an API gravity of less than about 15°. These stocks also contain generally about 10% by volume or more of asphaltenes which are insoluble in n-pentane.

We have found that when the start-up procedure of our invention as broadly described above is employed with a high severity hydrodesulfurization process, substantially improved catalyst life is obtained in the hydrodesulfurization process and the hydrodesulfurization process itself can be more effectively conducted to accomplish its purpose. Accordingly, our start-up procedure permits commencement of the hydrodesulfurization process at a temperature significantly lower than that which would otherwise be required. Thus, the hydrodesulfurization process for treatment of a particular sulfur and asphaltic containing residue to obtain a product having a specific reduced sulfur content can be commenced at a lower temperature, for example, 10° to 50° F. lower, if our start-up procedure has been employed as opposed to the initial temperature required for the hydrodesulfurization of the same feed stock to the same specific sulfur level when our start-up procedure has not been employed. We have also found that when our inventive start-up procedure is employed, the quantity of coke deposited on the catalyst at any specific time is substantially less than the coke deposited on the catalyst for a comparable period of time when operating in the absence of our start-up procedure. We have further found that the employment of our start-up procedure appears to permit operation of the subsequent hydrodesulfurization process in a manner whereby it is more selective for desulfurization as opposed to metals removal. This results not only in a more efficient operation of the process for its intended purpose but also reduces the amount of metal lay-down on the catalyst, thereby enhancing catalyst life. It is believed that reduced metals deposition on the catalyst not only reduces masking of active sites on the catalyst, thereby maintaining catalyst activity, but also to some extent contributes to the reduced carbon deposiion on the catalyst. Coupled with this reduced coke-on-catalyst level is a reduced aging rate, i.e. the required increase in temperature necessary to maintain a desired level of desulfurization or desired level of sulfur in product is less.

In order to illustrate our invention in greater detail, reference is made to the following examples.

EXAMPLE I

In this example a first hydrodesulfurization run was conducted employing the start-up procedure of our invention. Inspection data for the gas oil employed during the start-up procedure and the residual stock desulfurized in the hydrodesulfurization process are shown in Table I below.

TABLE I

|  | Gas oil | Residual stock |
|---|---|---|
| Gravity, ° API | 27.2 | 14.5 |
| Sulfur, percent by weight | 2.54 | 4.22 |
| Carbon residue, percent by weight | 0.11 | 8.9 |
| Viscosity, SUS 210 | 39.5 | 240 |
| Asphaltenes (insoluble in n-pentane), percent by weight |  | 9.3 |
| ASTM Distillation, ° F.: |  |  |
| 5% | 646 | 693 |
| 10% | 678 | 728 |
| 30% | 718 | 832 |
| 50% | 749 | 967 |
| 70% | 779 |  |
| 90% | 828 |  |
| End point | 885 |  |

The catalyst employed comprised 0.5% Ni, 1.0% Co and 8.1% Mo supported on alumina. This catalyst was initially contacted with the gas oil at a temperature of about 300° F., a hydrogen partial pressure of 2000 p.s.i. and a liquid hourly space velocity of 1.1. The temperature was gradually increased at the average rate of about 25° F. per hour until a temperature of 650° F. was attained. This temperature was then maintained for a period of about 12 hours while continuing contacting of the gas oil and the catalyst. At this point charging of the gas oil was discontinued and the residual stock was then charged to the reactor and operating temperature slowly raised to 710° F. The product from the hydrodesulfurization process was analyzed for sulfur content and the temperature was gradually increased so as to maintain a sulfur level in the product of about 1% or less. After 12 days of operation the temperature being employed was 740° F. and the sulfur content of the 65° F.+ product was 0.97%. After 20 days of operation the temperature being employed was 745° F. and the sulfur content of the 650° F.+product was 1.00%. The hydrogen consumption during this period was 615 s.c.f./bbl. of charge which is equivalent to about 4.8 molecular weights of hydrogen per atomic weight of sulfur removed.

In a separate run in which the start-up procedure of our invention was not employed a similar residual stock to that described above was immediately contacted with a presulfided nickel-cobalt-molybdenum alumina catalyst employing a hydrogen partial pressure of 1250 p.s.i. and a space velocity of 1.0. At the 12th day of operation this run required a temperature of 760° F. to provide a 650° F.+ product having a sulfur content of 1.12%.

TABLE II

|  | Without start-up procedure | | With start-up procedure | |
|---|---|---|---|---|
|  | S in product, percent by weight | Temperature, ° F. | S in product, percent by weight | Temperature, ° F. |
| 12 days | *0.97 | 760 | 0.97 | 740 |
| 20 days |  |  | 1.00 | 745 |

*Corrected value.

The data in Table II above clearly demonstrate that after 12 days of operation the temperature required to provide the same sulfur content in the 650° F.+ fraction when employing our start-up procedure is 20° F. less than required when operating without our start-up procedure. From previously obtained data it has been established that at an average aging rate of 1° F. per day when operating in the range from 770° to 800° F. with a hydrogen partial pressure of 2000 p.s.i. the ability to operate at a temperature 20° F. lower than otherwise required when employing our start-up procedure results in an increased catalyst life and a 20 day extension of cycle life.

That this same 20 day extension and cycle life can not be obtained simply by continuing the operation until a temperature of 820° F. is reached rather than 800° F. can be seen from the data shown in Table III illustrating the change in product distribution obtained with such increase.

TABLE III

|  | Product at 800° F. | Product at 820° F. |
|---|---|---|
| C₂ and Lighter, percent by wt | 0.8 | 1.2 |
| C₃, percent by volume | 0.8 | 1.2 |
| Gasoline, percent by volume | 5 | 9 |
| Furnace oil, percent by volume | 12 | 16 |
| Residual, percent by volume | 84 | 77 |

The product distributions shown in Table III above demonstrate that continuing the operation into the temperature range above 800° F. is effective to cause a substantial increase in undesired hydrocracking. This can be seen by the over-all increase of materials boiling below furnace oil range and lower.

EXAMPLE II

In this example a comparison is made between two hydrodesulfurization runs in which the stock to be desulfurized is the same residual stock employed in Example I and the catalyst is a presulfided nickel-cobalt-molybdenum on alumina catalyst in which the metals are present in the same quantities as described in Example I. In one of the hydrodesulfurization runs of this example the start-up procedure of our invention is employed using a desulfurized gas oil substantially the same as that described in Example I but having a reduced sulfur content. The other run of this example was conducted without the benefit of our startup procedure. Both of these runs are conducted at a hydrogen partial pressure of about 2000 p.s.i.g. and a space velocity of about 1.25. At the 20th day of operation the run conducted without our start-up procedure requires a temperature of about 765° F. in order to provide a 650° F.+ product having a sulfur content of 1% or less. On the other hand, the run being conducted with our start-up procedure requires a temperature of only about 755° F. at the 20th day in order to provide the same low sulfur content product. It will be seen, therefore, that the start-up procedure of our invention can be conducted by employing a low sulfur content or substantially sulfur-free gas oil when a presulfided catalyst is to be employed and that advantageous results are obtained. It will also be noticed that the advantages obtained when employing a presulfided catalyst in our start-up procedure are somewhat diminished when compared to the results obtained when employing a substantially unsulfided catalyst and sulfiding the catalyst in situ in our start-up procedure by employing a sulfur containing gas oil as was illustrated in Example 1.

EXAMPLE III

In this example two vacuum residues having a 50% point about 950° F. and having similar coking tendencies were employed in two separate hydrodesulfurization processes, both at a hydrogen partial pressure of 2000 p.s.i. The start-up procedure of our invention was employed with one of these hydrodesulfurization processes while it was not employed with the other. In the run conducted without employing our start-up procedure the carbon on the catalyst was 23% by weight after 10 days of operation. In the hydrodesulfurization process conducted with our start-up procedure the carbon on the catalyst was only 15.5% after 39 days of operation. It will clearly be seen, therefore, that the catalyst employed in the hydrodesulfurization run commenced with our start-up procedure contained substantially less carbon than the catalyst employed in the hydrodesulfurization process operated in the absence of our start-up procedure. Furthermore, this reduced quantity of carbon on the catalyst alone would be significant but it will also be noticed that this reduced quantity of carbon on the catalyst was after a period of operation almost four times as long as that of the catalyst containing the higher carbon content.

EXAMPLE IV

In this example a hydrodesulfurization run was conducted employing the start-up procedure of our invention. The gas oil employed during the start-up procedure and the residual stock charged to the hydrodesulfurization process as well as the catalyst employed were the same as employed in Example I. The conditions employed included a space velocity of 1.1, a hydrogen partial pressure of 2000 p.s.i.g. and a hydrogen feed rate of 5000 s.c.f. of hydrogen per barrel of hydrocarbon. From previously obtained data it was determined that an initial temperature of about 750° F. would be necessary in order to effect desulfurization of this residual stock under the above mentioned conditions employing a presulfided catalyst in order to obtain a product containing 1% by weight of sulfur or less.

The catalyst was initially contacted with the gas oil at a temperature of about 300° F. The temperature was then gradually increased to 640° F. over a period of 12 hours. The temperature was then maintained at 640° F. for an additional 12 hour period during which time the contacting with the gas oil was continued. Contacting with the gas oil was then discontinued and contacting of the residual stock was commenced at which time the temperature was increased to 710° F. over a period of about 14 hours. During the next 16 hours the temperature was increased slightly so as to provide an average temperature of 713° F. at which time a product containing less than 1% sulfur was obtained. As the run was continued the product was analyzed for sulfur content and the temperature was increased as required in order to maintain the sulfur level in the product at about 1% or less. After 28 days of operation the temperature required to produce a product containing 1% sulfur or les was less than 750° F. It will be seen, therefore, that the start-up procedure of our invention permitted operation with the desired degree of desulfurization for a period of 28 days without employing a temperature as high as that which would initially be required in the absence of our start-up procedure. During this 28 day period the average hydrogen consumption was 4.8 molecular weights of hydrogen per atomic weight of sulfur removed.

This hydrodesulfurization run was continued beyond the 28th day of operation and at the 40th day of operation a temperature of only 755° F. was required to provide a product having the desired sulfur content of 1% by weight or less.

EXAMPLE V

Following the start-up procedure of our invention substantially as described in the previous examples, an asphaltic-free hydrocarbon stock is initially contacted with the catalyst at a temperature of about 250° F. The temperature is then increased over a period of about 8 to 12 hours until a temperature in the range of about 600° to 700° F. is attained. Contacting of the catalyst with the asphaltic-free stock is continued for an additional 8 to 12 hours after which period of time the contacting with the asphaltic-free stock is discontinued. The temperature of the catalyst bed is then reduced to the range from about 400° to about 450° F. This can be accomplished in a variety of ways such as, for example, by discontinuing passage of any heated material to the catalyst bed or by charging a cool, inert gas to the catalyst bed. Contacting of the asphaltic containing residual hydrocarbon with the catalyst is then commenced at this lower temperature. The effluent from the reactor is analyzed for sulfur content and the temperature is increased from the 400° to 450° F. range at a rate sufficient to maintain the sulfur content in the effluent at about 1% by weight or less. A period ranging from about 2 days up to about 10 days or even longer is required before the temperature being employed to maintain the sulfur level in the effluent of about 1% or less has reached the level of about 700° F. which is otherwise employed with our start-up procedure. It will be seen, therefore, that employment of this preferred embodiment of our invention is effective to increase further, by the period of 2 to 10 days or even longer, the catalyst life over and above the unexpected increase obtained in accordance with our inventive start-up procedure wherein the temperature of the catalyst bed is not reduced after contacting with the asphaltic-free stock and prior to contacting with the asphaltic containing residual stock.

We claim:

1. A start-up procedure for use in a high severity hydrodesulfurization process, which process comprises hydrodesulfurizing a residual containing hydrocarbon feed which is composed substantially of hydrocarbons boiling above about 900° F. and which contains a substantial quantity of asphaltic materials utilizing a catalyst which consists essentially of a metalliferous hydrogenating component composited on alumina, the metalliferous hydrogenating components being in substantially sulfided form during the major portion of the hydrodesulfurization process, the hydrodesulfurization process being conducted so as to remove at least about 70% of the sulfur contained in the residual hydrocarbon feed with a total hydrogen consumption from about 1 to about 5 molecular weights of hydrogen per atomic weight of sulfur removed and at a temperature up to about 850° F., said start-up procedure comprising initially contacting a hydrocarbon which is substantially free of asphaltic materials with hydrogen in the presence of the catalyst which consists essentially of a metalliferous hydrogenating component composited on alumina at a temperature from about 250° to about 500° F., a hydrogen partial pressure from about 750 to about 5000 p.s.i. and at a space velocity from about 0.1 to about 10.0 volumes of the asphaltic-free hydrocarbon per hour per volume of catalyst, gradually increasing the temperature until a temperature in the range from about 600° to about 700° F. is attained, discontinuing contacting of the asphaltic-free hydrocarbon and commencing contacting of the asphaltic containing residual hydrocarbon at substantially the same pressure and space velocity employed during contacting of the asphaltic-free hydrocarbon.

2. The procedure of claim 1 wherein the asphaltic-free hydrocarbon boils in the range from about 600° to about 850° F., the hydrogen partial pressure is from about 1500 to about 3000 p.s.i., the space velocity is from about 0.5 to about 5.0 volumes of hydrocarbon per hour per volume of catalyst, the temperature is increased at a rate less than about 100° F. per hour during the start-up procedure until a temperature in the range from about 600° to about 650° F. is attained.

3. The procedure of claim 1 wherein the asphaltic-free hydrocarbon contains up to about 4% by weight of sulfur.

4. The procedure of claim 1 which further includes reducing the temperature of the catalyst to the range from about 400° to about 450 F. after discontinuing contacting of the asphaltic-free hydrocarbon and before commencing contacting of the asphaltic-containing residual hydrocarbon.

5. The procedure of claim 1 wherein the temperature in the range from about 600° to about 700° F. is maintained for a period from about 8 to about 24 hours before discontinuing contacting of the asphaltic-free hydrocarbon.

6. The procedure of claim 1 wherein the support is alumina.

7. The procedure of claim 1 wherein the metalliferous hydrogenating component is substantially unsulfided when initially contacted with the asphaltic-free hydrocarbon and the asphaltic-free hydrocarbon contains up to about 4% by weight of sulfur.

8. The procedure of claim 1 wherein the residual containing hydrocarbon is comprised of at least 40% by volume of hydrocarbons boiling above about 900° F. and about 10% by volume of asphaltenes insoluble in n-pentane and contains from about 2 to about 6% by weight of sulfur.

9. The procedure of claim 1 wherein the hydrodesulfurization process is conducted so as to remove at least 80% of the sulfur contained in the residual hydrocarbon.

References Cited

UNITED STATES PATENTS

| | | | |
|---|---|---|---|
| 2,953,519 | 9/1960 | Bercik et al. | 208—216 |
| 3,244,617 | 4/1966 | Galbreath | 208—216 |

DELBERT E. GANTZ, *Primary Examiner.*

G. J. CRASANAKIS, *Assistant Examiner.*

U.S. Cl. X.R.

208—216, 217

UNITED STATES PATENT OFFICE
CERTIFICATE OF CORRECTION

Patent No. 3,423,307    Dated January 29, 1969

Inventor(s) Joel D. McKinney and William C. Offutt

It is certified that error appears in the above-identified patent and that said Letters Patent are hereby corrected as shown below:

Column 2, line 16, "boilng" should read--boiling--. Column 3 line 17, "parial" should read--partial--. Column 4, line 8, "deposiion" should read--deposition--; and line 53, "65° F.+" should read--650° F.+--. Column 5, line 71, after "point" insert--above--. Column 6, line 53, "les" should read--less-

SIGNED AND
SEALED
JAN 27 1970

(SEAL)
Attest:

Edward M. Fletcher, Jr.
Attesting Officer

WILLIAM E. SCHUYLER, JR.
Commissioner of Patents